March 30, 1965     C. C. ROSHON     3,175,855
FILM STRIP OR CHIP PICKING MECHANISM
Filed June 28, 1962

INVENTOR.
CLYDE C. ROSHON
BY John L. Jackson
ATTORNEY

United States Patent Office 3,175,855
Patented Mar. 30, 1965

3,175,855
FILM STRIP OR CHIP PICKING MECHANISM
Clyde C. Roshon, San Jose, Calif., assignor to International Business Machines Corporation, New York, N.Y., a corporation of New York
Filed June 28, 1962, Ser. No. 205,999
6 Claims. (Cl. 294—104)

This invention relates to picking mechanisms in general and more particularly to a picking mechanism for picking and registering within the picking mechanism a strip or other similar type of data storage media for subsequent movement for processing.

In many storage applications, particularly in the field of information storage and retrieval, information must be stored in visual form. Conventional storage configurations such as disks, drums and tapes normally used in magnetic storage applications have generally proved to be either unworkable, as in the case of disks and drums, due to their limited storage capacities or, undesirable due to the high access times required, as in the case of tapes.

One solution to the problem of what type of storage configuration to use in visual storage systems has been the use of a discrete length of film on which a number of photographic images can be formed. The discrete lengths of film are stored in a cell-type arrangement and for readout purposes are moved to an output station at which the photographic content of the particular image involved is either projected for viewing or reproduced for subsequent use at another location. Since ordinarily images are stored on the discrete length of photographic film in greatly reduced size, registration of the film is extremely critical. Additionally, often the lengths of film are stored in the retaining grooves in the cells in a "bowed" condition such that pressure is exerted on the film to prevent it from leaving the bin except when selectively moved for processing purposes. Bowing of the film, however, creates indexing problems for the picking mechanism in addition to making the picking or grasping of the film more difficult especially when the film has a registration slot located substantially at its center.

Other problems encountered in discrete length storage film systems are that the handling mechanisms are usually very complex and often relatively slow in operation which adversely affects the access time of the system. Additionally, since often hundreds of photographic images may be stored on a single film strip, the frequency of access is relatively high which often results in relatively short life for the film strips.

Thus, ideally, a picking mechanism for use in a discrete length film strip storage system should be not only simple and highly reliable, but, additionally, should be capable of an extremely high rate of operation with little resultant damage to the film strips involved. Likewise, it should provide good registration of the film within it and should be capable of indexing and grasping a film strip whether the film strip is stored in a bowed or straight configuration. Moreover, the picking mechanism should be quite small to allow close spacing of the film strips to provide maximum photographic storage per unit volume.

It is, therefore, an object of the present invention to provide a novel picking mechanism for use in a discrete length film strip data storage system.

Another object of the present invention is to provide a picking mechanism for use in a film strip data storage system which not only is highly reliable but, additionally, is small, simple and relatively inexpensive.

Another object of the present invention is to provide a picking mechanism for use in a film strip data storage system which is capable of a rapid picking operation with little resultant damage to the associated film strips.

Another object of the present invention is to provide a picking mechanism for use in a film strip data storage system which provides good registration and is compatible for use in picking both bowed and straight stored film strips.

Other and further objects and advantages of the invention will be apparent from the following more particular description of the preferred embodiment of the invention, as illustrated in the accompanying drawings in which.

Briefly, a picking mechanism for picking a film strip or chip from a cell of a data storage configuration is presented which has two tapered camming blades for aligning the selected strip or chip for insertion of a picking finger. Insertion of the picking finger is under control of a solenoid or similar device while registration of the selected chip or films in the picking mechanism is accomplished by use of a pressure bar which assures proper seating of a registration slot in the film or chip on the picking finger.

Figure 1:
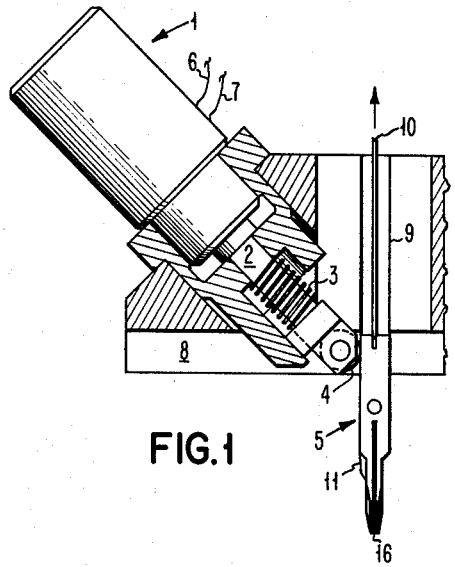
FIG. 1 is a side view of the herein described picking mechanism showing one method of actuation.

Refer first to FIG. 1 where is illustrated a solenoid type device 1 having an armature 2 which is spring loaded outward by means of a spring 3 to cause armature contact roller 4 to actuate the picking mechanism 5 as will hereinafter be more fully explained. Application of a potential on lines 6 and 7 causes the solenoid 1 to operate thereby retracting the armature 2 and, consequently, the armature contact roller 4 from contact with the picking mechanism 5. The solenoid arrangement is mounted on a guide block 8 which contains a guide slot 9 through which the picking mechanism 5 travels in the directions indicated by the arrows accompanying FIG. 1. The picking mechanism 5 is moved in the direction of the arrows by means of a steel tape 10. The particular means of moving the tape strip 10 to accomplish withdrawal of the picking mechanism 5 is not part of the present invention.

Figure 2A:
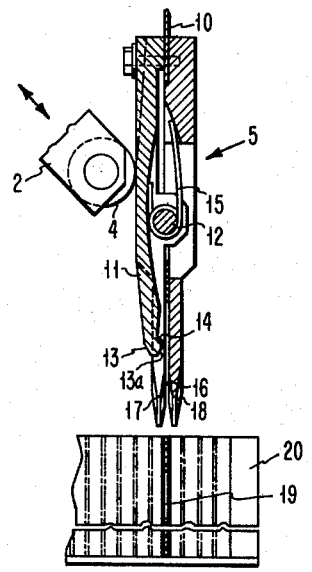
FIG. 2A is a cutaway side view of the herein described picking mechanism taken along line 2—2 of FIG. 3 which is illustrative of the mechanism as it brought down over a strip to be withdrawn from a cell.

Refer next to FIG. 2A wherein the picking mechanism 5 is shown as in FIG. 1 with the solenoid de-energized such that the armature contact roller 4 is in contact with the picking finger 11 which pivots about shaft 12. Picking finger 11 includes at one extremity thereof a bevelled portion 13 and a film support ledge 14. The picking finger 11 is biased by means of spring 15 such that the extremity including the bevelled portion 13 and film support ledge 14 are biased toward the film retaining slot 16 defined by the bevelled camming blades 17 and 18. Energization of the solenoid 1 which results in the removal of the armature contact roller 4 from the picking finger 11 allows the spring 15 to move the extremity of the picking finger 11 including the film support ledge 14 and the bevelled portion 13 into the film retaining slot 16.

Figure 3:
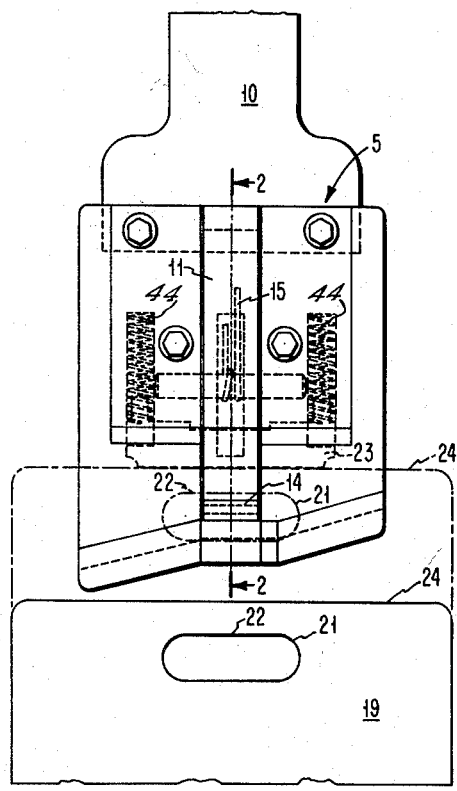
FIG. 3 is a front view of the picking mechanism and film strip or chip.
Figures 2B, 2C:
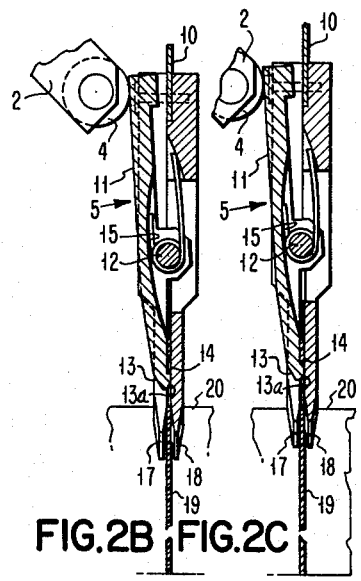
FIG. 2B is a cutaway side view taken along line 2—2 of FIG. 3 which is illustrative of the picking mechanism at the point of maximum insertion into the cell during the picking sequence.
FIG. 2C is a cutaway side view taken along lines 2—2 of FIG. 3 which is illustrative of the positioning of the film strip in the picking mechanism as the picking mechanism and film strip are being withdrawn from the cell.

As shown in FIGS. 2A, 2B and 2C, a plurality of film memory strips 19, one of which is to be selected, are contained in a cell 20. As better shown in FIG. 3, each of the film memory strips 19 contains a registration slot 21 having a straight upper face 22. During operation of the picking mechanism, the film support ledge 14 of the picking finger 11 will be in intimate contact with the upper edge 22 of the registration slot 21 as will hereinafter be more fully described. Also shown in FIG. 3 is a biased pressure bar 23 which acts upon the upper surface or edge 24 of the film strip or film chip 19. The bias bar 23 is spring loaded downward by means of springs 44 to thereby apply pressure to the film chip or strip 19 and cause the upper edge 22 of the registration slot 21 to be in intimate contact with the film support ledge 14 to provide accurate registration.

In operation, when a strip 19 is to be selected from the cell 20, solenoid 1 is de-energized such that due to the spring pressure of spring 3 the armature roller 4 is in contact with the picking finger 11. The extremity of the picking finger 11 on which the film support ledge 14 is located is thereby moved from the film slot 16. Thus, the selected film strip 19 can enter freely between the bevelled camming blade members 17 and 18 as the picking mechanism 5 is brought down into the cell 20. The picking mechanism 5 as shown in FIG. 2B is inserted into the cell 20 to a depth such that springs 44 are compressed by action of the upper edge 24 of film strip 19 on the biasing block 23 to allow the registration slot 21 to come into alignment with the extremity of the picking finger 11 including the film support ledge 14 and bevelled portion 13. The solenoid 1 is then energized and as shown in FIGS. 2B and 2C, the spring 15 operating on picking finger 11 causes the extremity 13–14 of picking finger 11 to be inserted in registration slot 21. The solenoid remains energized until the picking mechanism 5 and film 19 have been withdrawn.

In certain applications of low access where film wear would not be great, the solenoid 1 could be energized at any time prior to insertion of the picking mechanism 5 in the cell 20. In such an application, the striking of the upper edge of the film strip 19 on the inner slanted surface 13a of the picking finger 11 would kick the finger from the film retaining slot 16 to thereby allow the film strip 19 to enter therein.

As illustrated in FIG. 2C, at the commencement of the withdrawal action, the upper edge 22 of the registration slot 21 and the film support ledge 14 are forced into intimate contact by action of springs 44 on the bias bar 23 such that accurate film strip registration within the picking mechanism 5 is provided.

Replacing of the memory strip 19 is accomplished in exactly the opposite manner as the withdrawal sequence. Hence, during the replacing sequence, the solenoid 1 is de-energized such that as the picking mechanism 5 passes down through slot 9, the armature contact roller 4 comes in contact with the picking finger 11 thereby causing the extremity 13–14 of picking finger 11 to move from the picking slot 18 of film 19. Action of the bias bar 23 and spring combination 44, however, continually apply pressure on the upper portion 24 of film strip 19 to thereby assure that it is properly seated in the cell 20. The picking mechanism 5 is then removed while the solenoid 1 remains de-energized and the whole mechanism is then positioned over another strip of film which is to be accessed.

As shown in FIG. 3, the bevelled camming blades 17 and 18 of the picking mechanism 5 are tapered. The slanting of the blades 17 and 18 is an extremely important aid to the indexing of the picking mechanism 5. As previously discussed, often the strips or chips to be accessed are stored in the cell in a slightly bowed condition to assure that the strips or chips will only leave the bin when selectively accessed. Thus, since it is virtually impossible to provide a uniform bow to the strip or chip, registration is more accurately provided by accessing the edge of the strip or chip which is held in a slot of the cell, which slot location is accurately located. Thus, during the accessing operation the picking mechanism 5 is addressed to the slot in the cell which contains the desired strip 19 to be accessed and the picking mechanism 5 is brought down over the selected strip or chip. As shown in FIG. 3, the left hand portion of the blades 17 and 18 come down over the strip or chip near its left hand edge. The strip 19 is thus contained between blades 17 and 18. As the picking mechanism 5 moves down over it the curved strip edge is cammed into line between the blades 17 and 18 until the blades have been completely lowered over the strip 19. Thus, the picking mechanism 5 has been reliably inserted at the side of the strip 19 and the strip made to conform such that the picking finger 11 may be inserted in the registration slot 21 located at the center of the strip.

Picking mechanisms have been constructed in accordance with the present invention which have been utilized in data storage configurations wherein .005" tape strips are stored in .010" grooves which are spaced .025" apart, center to center. Thus, in such an application, it is quite obvious that not only must the picking mechanism itself be quite small, but, in addition, registration of the picking mechanism over a selected strip must be extremely accurate to prevent damage to the strip and assure selection of the desired strip.

In summary, a picking mechanism 5 for picking a strip or chip 19 from a cell 20 has been presented which has tapered alignment blades 17 and 18 for aligning the selected strip or chip for insertion of a picking finger 11. Insertion of the picking finger 11 is under control of a solenoid 1 or similar device. Registration of the selected chip or film 17 within the picking mechanism 5 is accomplished by use of a bias bar 23 which assures proper seating of the film or chip on the film support ledge 14 of the picking finger 11.

In the above described manner I have provided a novel picking mechanism for use in a discrete length film strip information storage system which not only is highly reliable, but, additionally, is simple and relatively inexpensive. Likewise, the herein described picking mechanism is capable of a rapid picking operation with little resultant damage to the film strips or chips while at the same time providing good registration whether utilized in picking bowed or straight stored film.

While the invention has been particularly shown and described with reference to a preferred embodiment thereof, it will be understood by those skilled in the art that various changes in the form and details may be made therein without departing from the spirit and scope of the invention.

What is claimed is:

1. In a data storage system having a plurality of closely spaced memory strips each having a registration slot and being stored in a cell, a device for selectively removing and replacing each of said memory strips comprising:
    two blade members adapted to receive said memory strip therebetween,
    finger means operable to selectively enter said registration slots of said memory strip when said memory strip is contained between said blade members, and
    a bias bar operable to force the upper edge of said registration slot of said memory strip into contact with said finger means.

2. In a data storage system having a plurality of closely spaced memory strips each having a registration slot and being stored in a cell, a device for selectively removing and replacing each of said memory strips comprising:
    two tapered blade members adapted to receive said memory strip therebetween,
    finger means operable to selectively enter said registration slot of said memory strip when said memory strip is contained between said two tapered blade members, and a bias bar operable to force the upper edge of said registration slot of said memory strip into contact with said finger means.

3. In a data storage system having a plurality of closely spaced memory strips each having a registration slot and being stored in a cell, a device for selectively removing and replacing each of said memory strips comprising:

two blade members defining a film slot adapted to receive said memory strip therein, finger means operable in said film slot to selectively enter said registration slot of said memory strip when said memory strip is contained in said film slot, and a bias bar operable to force the upper edge of said registration slot of said memory strip into contact with said finger means.

4. In a data storage system having a plurality of closely spaced memory strips each having a registration slot and being stored in a cell, a device for selectively removing and replacing each of said memory strips comprising:

two tapered blade members defining a film slot adapted to receive said memory strip therein, finger means operable in said film slot to selectively enter said registration slot of said memory strip when said memory strip is contained between said tapered blade members, and a bias bar operable to force the upper edge of said registration slot of said memory strip into contact with said finger means.

5. In a data storage system having a plurality of closely spaced memory strips each having a registration slot and being stored in a cell, a device for selectively removing and replacing each of said memory strips comprising:

two tapered blade members defining a film slot adapted to receive said memory strip therein, finger means operable in said film slot to selectively enter said registration slot of said memory strip when said memory strip is contained therein, and a bias bar operable on said film strip when said film strip is contained in said film slot to force the upper edge of said registration slot of said memory strip into contact with said finger means.

6. In a data storage system having a plurality of closely spaced memory strips each having a registration slot and being stored in a cell, a device for selectively removing and replacing each of said memory strips comprising:

two tapered blade members defining a film slot adapted to receive said memory strip therein, finger means pivotally connected to said tapered blade members operable to selectively enter said registration slot of said memory strip when said memory strip is contained between said blade members, and a bias bar operable to force the upper edge of said registration slot of said memory strip into contact with said finger means.

References Cited by the Examiner
UNITED STATES PATENTS

| 1,768,326 | 6/30 | Miller | 24—230.1 |
| 2,153,077 | 4/39 | Clarke | 24—230.1 |
| 2,867,024 | 1/59 | Sepe | 24—230.1 X |
| 2,893,777 | 7/59 | O'Neill et al. | 294—1 |
| 3,124,260 | 3/64 | Tidball | 294—65.5 |

References Cited by the Applicant
UNITED STATES PATENTS 3,126,008    3/64    Geddes.

LOUIS J. DEMBO, *Primary Examiner.*

ANDRES H. NIELSEN, *Examiner.*